United States Patent [19]
Walsh

[11] Patent Number: 5,268,693
[45] Date of Patent: Dec. 7, 1993

[54] SEMICONDUCTOR FILM FREE ELECTRON LASER

[75] Inventor: John E. Walsh, Bradford, Vt.

[73] Assignee: Trustees of Dartmouth College, Hanover, N.H.

[21] Appl. No.: 932,277

[22] Filed: Aug. 19, 1992

Related U.S. Application Data

[63] Continuation of Ser. No. 576,362, Aug. 31, 1990, abandoned.

[51] Int. Cl.$^5$ .............................................. H01S 3/09
[52] U.S. Cl. ........................................ 372/74; 372/2; 372/92
[58] Field of Search .......................... 372/2, 74, 43, 92

[56] References Cited

U.S. PATENT DOCUMENTS

| | | | |
|---|---|---|---|
| 2,634,372 | 10/1949 | Salisbury | 250/36 |
| 2,866,917 | 12/1958 | Salisbury | 372/74 |
| 3,393,373 | 7/1968 | Stimler | 372/74 |
| 3,423,694 | 1/1969 | Jones | 372/74 |
| 3,439,169 | 4/1969 | Lynch | 372/74 |
| 4,122,372 | 10/1978 | Walsh | 315/5 |
| 4,298,824 | 11/1981 | Walsh | 315/4 |
| 4,727,550 | 2/1988 | Chang et al. | 372/2 |
| 4,874,953 | 10/1989 | Katz | 250/493.1 |

OTHER PUBLICATIONS

AIP Conference Proceedings 184 "Physics of Particle Accelerators", American Institute of Physics, New York, 1989. (no month).
Garate et al. (1988) Nucl. Instruments Meths. Physics Res. A272, pp. 129–131 (no month).
Marshall et al. (Apr. 1988). IEEE Transactions on Plasma Sci. 16:199–205.
Walsh et al. (1988) Nuclear Instruments Meths. Physics Res. A272, pp. 132–135 (no month).
Ciocci et al. (1987) Nuclear Instruments Meths. Physics Res. A259, pp. 128–132. (no month).
Garate et al. (1987) Nuclear Instruments Meths. Physics Res. A259, pp. 125–127. (no month).
Walsh et al. (1987) Free-Electron Lasers, SPIE vol. 738, pp. 70–82. (no month).
Garate et al. (May 1986) Amer. Inst. Physics, Appl. Lett. 48, pp. 1326–1328.
Walsh et al. (Jun. 5–6 1986) Far-Infrared Sci. Technol. SPIE vol. 666, pp. 22–27.
Walsh et al. (1986) AIP Conference Proceedings 146, pp. 120–123. (no month).
Garate et al. (Jul. 1985) J. Appl. Phys. 58:627–635.
Walsh et al. (Jul. 1985) IEEE J. Quantum Electronics QE–21:920–923.
Walsh et al. (26 Jun.–1 Jul. 1983) SPIE Conf. Proceedings 453:376–379.
Walsh et al. (Aug. 1982) IEEE J. Quantum Electronics QE–18, pp. 1259–1264.
Walsh (1982) Advances Electronics Electron Physics, vol. 58. (no month).
Mizuno et al. (Aug. 1973) IEEE Trans. Elect. Dev. ED–20, pp. 749–752.
Rusin et al. (Apr. 1969) Proc. IEEE 57:720–722.
Salisbury (Oct. 1966) Science 154:386–388.
Smith et al. (1953) Phys. Rev. 92:1069. (no month).
Ciocci et al. (1986) Abstract "The Microtron FEL Cherenkov: theoretical and experimental aspects", Amer. Inst. Physics, pp. 124–125. (no month).

Primary Examiner—James W. Davie
Attorney, Agent, or Firm—Lahive & Cockfield

[57] ABSTRACT

Semiconductor film FEL uses an electron beam and a semiconducting-film-loaded, open, quasi-optical resonator to produce coherent, electromagnetic radiation at submm and far-infrared wavelengths.

21 Claims, 12 Drawing Sheets

| $r_b(\mu m)$ | $I_b$ ($J_b = 10^3$ A/cm²) | $P_b$ $V_b = 100$ kV | $P_b$ $V_b = 1$ MV | $\lambda_c$ (μm) 100 kV | $\lambda_c$ (μm) 1 MV |
|---|---|---|---|---|---|
| 1 | 31.4 μA | 3.14 | 31.4 W | 9.4 | 2.2 |
| 2 | 126 μA | 12.6 W | 126 W | 18.8 | 4.4 |
| 5 | 785 μA | 78.5 W | 785 W | 47 | 11 |
| 10 | 3.14 mA | 314 W | 3.14 kw | 94 | 22 |
| 20 | 12.6 mA | 1.26 kw | 12.6 kw | 188 | 44 |
| 50 | 78.5 ma | 7.85 kw | 78.5 kw | 470 | 110 |
| 100 | 314 ma | 31.4 kw | 314 kw | 940 | 220 |

*FIG. 19*

SEMICONDUCTOR FILM FREE ELECTRON LASER

This application is a continuation of application Ser. No. 576,362, filed Aug. 31, 1990, now abandoned.

BACKGROUND OF THE INVENTION

This invention relates generally to apparatus and methods for generating coherent electromagnetic radiation, and, more particularly, relates to tunable free electron laser (FEL) apparatus and methods for generating coherent radiation over a wide range of wavelengths.

The importance of a versatile and convenient far infra-red (FIR) submillimeter (submm) source is a direct consequence of the large range of research opportunities and technical applications associated with this spectral region. Examples of opportunities may be gathered under the broad headings of spectroscopy and technology development.

Spectroscopy applications include surface science, condensed-matter phenomena, excitations in high $T_c$ superconductor, laser chemistry, radio astronomy, diagnostics in thermonuclear plasmas, conformational excitations in biomolecules, gas phase spectroscopy (rotational excitations).

Technology development activities include submm radar, Radar modeling, countermeasures for FIR systems, space communications, compact high-gradient accelerator research, plasma heating, isotope separation.

In view of the importance of the FIR spectral range, considerable effort has been expended in this area. During the preceding three decades, much of this work has centered on developing improved detectors and better spectroscopic systems. At present, these systems are nearing perfection. Fundamental limits to detector sensitivity are now approached with liquid-helium-cooled detectors. There have also been major advances in both spectrometer design and in the fabrication of signal processing components. Further development in the latter categories can be expected, but research emphasis is now switching to sources. Increased source power automatically provides greater signal-to-noise ratio and if stability is adequate, better resolution. Furthermore, the study and exploitation of nonlinear and transient processes which are not possible with continuum and other low-power sources, now become accessible options.

During the last decade-and-a-half there have been new additions to the FIR submm source population and continued development of older concepts. These include microwave tubes, impatt diodes, gyrotrons, FIR lasers, semiconductor lasers, and FELS.

MICROWAVE TUBES

Conventional microwave tubes such as the magnetron, the klystron and the traveling-wave tube amplifier are the sources of choice for moderate and high-power applications in the cm-wavelength region. They have reached a very advanced state of development. However, straightforward extrapolation of these designs for operation at shorter wavelengths encounter fundamental limitations in the lower-mm regime. They are generally not attractive options for a source which is to operate at a wavelength less than 1 mm. One exception is the backward-wave oscillator (BWO), which is sometimes also known as the carcinotron. These devices have been operated at frequencies in the 1-2 Thz region (300–150ξm). They may be used for spectroscopy but at these short wavelengths, the output power and the efficiency are both very low (10's $\mu$w and $10^{-5}$–$10^{-4}$%). This limits their utility.

IMPATT DIODES

Harmonics from these negative resistance devices can be used to produce low levels of power in the submm regime. It is possible to use them for some spectroscopic applications. They can be used directly or mixed with FIR lasers for use at still shorter wavelengths. These systems are usually delicate and difficult to use. Furthermore, the power is extremely low ($<1\mu$w). Other "negative resistance" sources such as superlattice structures are interesting, but the power available in the submm region is also very low and it may not be possible to extend their operation into the FIR regime.

GYROTRON

The gyrotron is a relatively new entry to the coherent source population. It is an extremely attractive option when high power in the mm range is required. Because of their potential for application to electromagnetic cyclotron resonance heating ECRH in fusion plasma heating, they have been extensively developed. However, once again, as the operating wavelength approaches 1 mm, they encounter fundamental limitations. It is in part due to this that plans for ECRH experiments at 1 mm were changed in order to employ the more highly-developed 2 mm gyrotrons. At shorter wavelengths, "whispering-gallery" and open-quasi-optical gyrotron resonators show promise for shorter-wavelength operation. However, the relation of the operating frequency to the applied magnetic field remains a fundamental limitation. High-harmonic operation is potentially a way around this latter difficulty. However, although the principle has been demonstrated at cm wavelengths, harmonic gyrotrons have not been operated at both high harmonic with a shorter ($\sim 1$ mm) fundamental wavelength. Hence, it is not yet clear whether or not operation at submm—FIR wavelength is possible.

A variation of the gyrotron known as the cyclotron autoresonance maser (CARM) partially circumvents the requirement for a high-static magnetic field by using the doppler upshift to advantage.

THE FIR LASER

This is the most widely-used FIR source. A few direct discharge FIR lasers exist, but the majority use optical pumping which is achieved almost universally, with a $CO_2$ laser. In the FIR there are several hundred lines which can be operated cw and several thousand which can be pulsed. CW power is low (10's of $\mu$w–100 mw) but pulsed power can be high (MW's on some lines). Excepting the lack of tunability, the OP-FIR laser is an excellent source. In some research applications this limitation is not relevant since another parameter such as magnetic field may be swept. When tunability is critical, however, the OP-FIR laser is of use only in those rare instances of a near coincidence of wavelength.

SEMICONDUCTOR HOT-HOLE LASERS

This is a relatively new device which is based on the placement of a germanium bar in crossed electric and magnetic fields. They have been operated in the 100 $\mu$m region and at present, the line width is relatively broad. In addition, they must be cooled, although this is not a serious drawback if liquid helium is being used elsewhere in the system. If they develop as projected, these sources will complete successfully for low-power applications in the FIR range.

THE FREE-ELECTRON LASER

The term free-electron laser was first introduced to describe a device which employed a spatially-periodic magnetic field (undulator) as a means of coupling a highly-relativistic electron beam to the electromagnetic field. Since the operation relied upon two doppler upshifts and thus wavelength scaled inversely with the square of the relative e-beam energy, these devices were generally termed beam energy tunable. At high beam energy however, varying the beam energy is not straightforward. Substantial accelerator realignment is required. Small fractional tuning can be achieved by changing the undulator gap. The highly relativistic version of the device was first operated at a wavelength between 3 and 4 μm and in subsequent experiments, operation of RF-linac-driven FEL's the operating wavelength has been extended to approximately 40 microns. Extension to longer wavelengths with the highly energetic beam drive is not attractive. It requires a long period and thus also long-interaction-length undulator. This is expensive and cumbersome. Versions of this device which employ short period "microundulators" are under active development. Electrostatic accelerator-driven FEL's also operate in the submm - FIR. However, these devices are large and thus are available only as a user-facility-based source.

It is an object of the invention to provide tunable laser apparatus capable of generating coherent radiation over a wide range of wavelengths.

It is another object of the invention to provide FEL devices that operate in the sub-millimeter and far infrared spectral region.

A further object of the invention is to provide laser devices that are compact in size, produce substantial output power, and have enhanced frequency stability.

Other general and specific objects of the invention will in part be obvious and will in part appear hereinafter.

SUMMARY OF THE INVENTION

The foregoing objects are attained by the invention, which Provides laser apparatus including resonator elements for defining a resonant cavity in which stimulated radiation can propagate to generate coherent electromagnetic laser radiation. The resonator elements include at least one semiconductor element having at least a first surface. A beam of electrons is directed over the surface of the semiconductor, with a velocity greater than a selected value determined by the phase velocity of light in the resonator elements. The passage of the electrons produces stimulated radiation from the semiconductor element, which propagates in the resonant cavity to generate coherent electromagnetic laser radiation. The coherent radiation can be tuned through a spectral range of approximately 1 centimeter to 0.2 microns.

The resonator elements also include a resonant cavity element having first and second ends, the first and second ends being positioned so that the beam enters the resonant cavity element at the first end and exits the resonant cavity element at the second end. First and second mirror elements are Positioned in proximity to an interior portion of the first and second end, respectively, for reflecting the stimulated radiation.

The electron beam can be generated by constant or pulsed sources, including high-brightness cathode elements or RF accelerators. In one aspect of the invention, electromagnet generate a magnetic field in proximity to the electron beam, to constrain the electron beam to pass over the surface of the semiconductor in a direction substantially parallel to the surface, in selected proximity to the surface.

The output of the laser can be tuned by control elements that vary electron beam energy, or by bias elements that apply a bias voltage to the semiconductor element, to vary the wavelength of the coherent electromagnetic laser radiation.

The invention can utilize various resonant cavity configurations. The surface of the semiconductor can be flat or curved, and multiple semiconductor elements can be employed in a "klystron" configuration. In another aspect of the invention, the surface of the coupling medium can include a grating pattern characterized by selected grating height and separation.

The semiconductor element can include silicon, germanium, or gallium arsenide. The structure can include silicon with dopant, or silicon deposited on a plastic, quartz, sapphire, or metal substrate.

A further aspect of the invention includes vacuum elements for evacuating a region about the resonant cavity element, and electron absorbing elements situated proximate the exit end of the resonant cavity.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIG. 19 sets forth the effects of various high-brightness cathodes useful as electron beam sources in one practice of the invention;

DESCRIPTION OF ILLUSTRATED EMBODIMENTS

Figure 1:
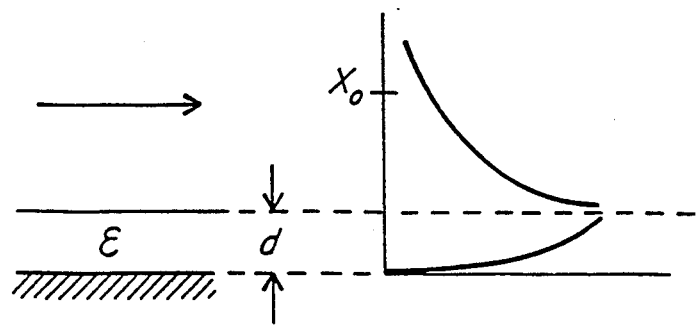
FIG. 1 is a schematic diagram depicting the Cerenkov laser mechanism, and particularly the relationship between an electron moving over a surface and the z-component of the electric field.
Figure 2:
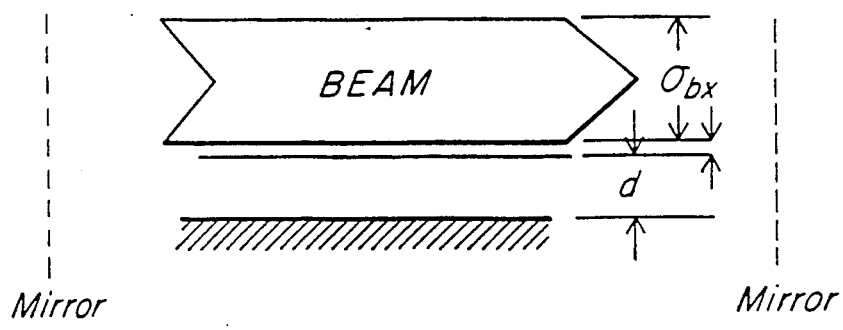
FIG. 2 is a schematic diagram depicting the relationship between the beam and the film cross-section.

FIGS. 1 and 2 show a laser in accord with the invention. The device uses an electron beam moving over the surface of a semiconducting film to produce coherent electromagnetic radiation. The anticipated operating range is the submm-FIR region of the spectrum and the electron beam energies required are modest (20–200 kV). The Cerenkov threshold energy increases as the relative dielectric constant of the film material decreases, and thus high-energy beams (hundreds of kV-MV) have been used. In both the low and high electron beam energy limits, the basic theory of operation is the same. An electron moving near the film surface with a velocity which exceeds that of light in the film material, emits both spontaneous and stimulated Cerenkov radiation. A portion of the stimulated Cerenkov radiation is trapped in a resonator formed by mirrors which terminate a length of surface waveguide. If the gain is sufficient, a coherent Cerenkov wave grows to saturation. The use of higher-index semiconducting materials for the surface guide reduces the beam energy required and leads to a physically smaller device, which is attractive for many applications. A further advantage of the semiconducting films lies in the fact that their dc conductivity is large enough to eliminate problems associated with charge buildup on the film surface.

A basic embodiment of the invention is illustrated on FIGS. 1 and 2. An electron moving above and parallel to the surface of a dielectric film of index n, with a velocity ($c\beta_o$) which is greater than the speed of light in the film material (c/n), will produce a spontaneous Cerenkov radiation wake. When mirrors are added, forming a resonator, the stimulated Cerenkov radiation will increase the stored energy in the fields. If the resonator Q is sufficient, a coherent oscillation will grow until nonlinear effects cause saturation. The central issues are dispersion and tuning, coupling and gain, the constraints imposed by beam quality, and nonlinear saturation.

DISPERSION AND TUNING

Figure 3:
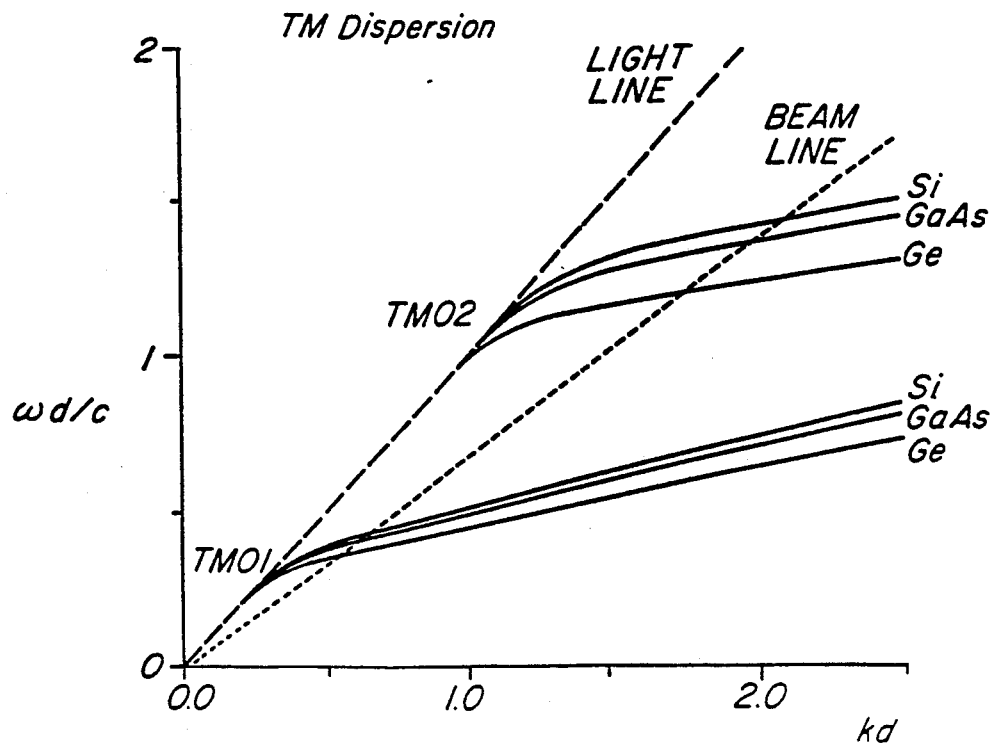
FIG. 3 is a graph showing dispersion effects in a free electron laser according to the invention, for silicon, gallium arsenide, and germanium.

The electron beam couples predominantly to the longitudinal electric field, or to the TM cavity modes. In the case of the structure illustrated on FIG. 1, the dispersion function for these modes takes the form:

$$D\left(\frac{\omega d}{c}, kd\right) = pd \operatorname{Tan} pd - \epsilon qd \qquad (1)$$

where $\omega d/c$ and $kd$ are the angular frequency and axial wavenumber scaled in units of film thickness d. The other variables, $$p^2 = \frac{\omega^2 \epsilon}{c^2} - k^2 \qquad (2a)$$

and $$q^2 = k^2 - \frac{\omega^2}{c^2} \qquad (2b)$$

are the transverse wavenumbers in the film (o( dielectric constant e) and vacuum regions respectively. The solutions on the $\omega d/c - kd$ plane determined from D=0 are illustrated in FIG. 3. Three film materials, Ge, GaAs and Si, and two branches of D=0, are shown. At long wavelengths ($\omega d/c \rightarrow 0$) the dispersion relation of the lowest-order mode becomes asymptotic to the speed of light in vacuum. As $\omega d/c$ increases, the phase velocity of the wave decreases. Eventually the dispersion relation becomes asymptotic to the speed of light in the dielectric. The evanescence scale length (q−1) decreases continuously along this trajectory. Higher-order branches of D=0 begin on the vacuum light line at points where $$\frac{wd}{c} = n\pi$$

and exhibit the same trends as the fundamental branch.

The spontaneous emission peaks at e-beam—wave synchronism, which is defined by:

$$\frac{\omega}{k} = c\beta_o \qquad (3)$$

The stimulated emission rate (growth) will peak at a point near but slightly below this point. Solving D =0 at synchronism determines the tuning function:

$$D_T\left(\frac{\omega d}{c}, \frac{\omega d}{c\beta}, \epsilon\right) = 0 \qquad (4)$$

Figure 4:
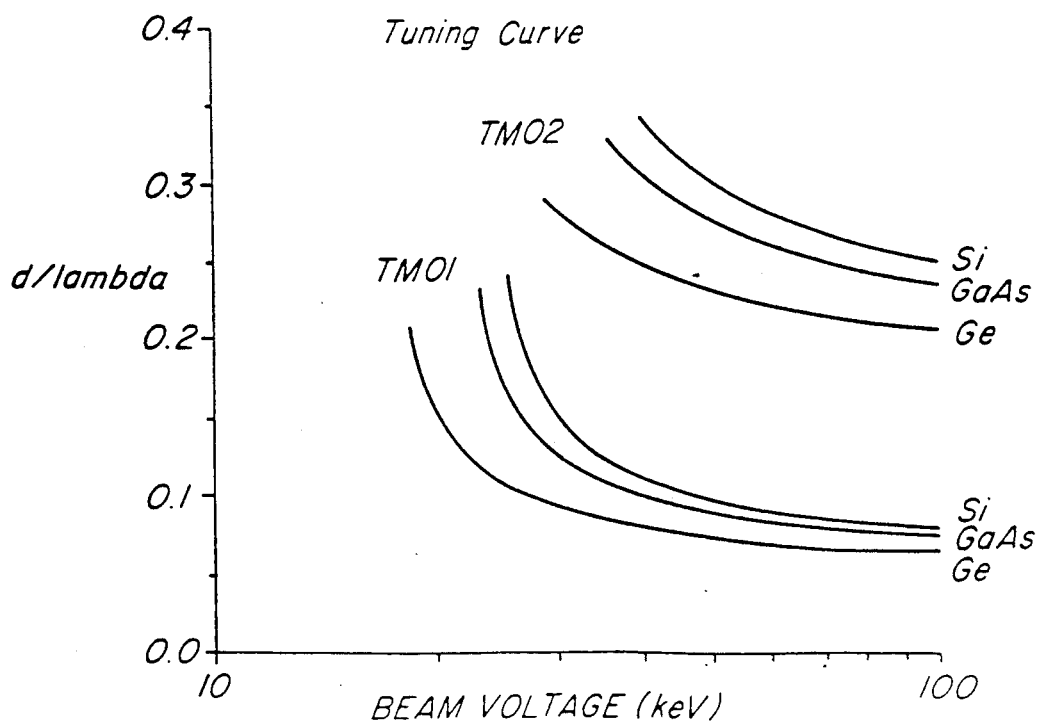
FIG. 4 is a graph showing tuning curves in a free electron laser according to the invention, for silicon, gallium arsenide, and germanium.

The tuning curves corresponding to the dispersion relations of FIG. 3 are shown on FIG 4. When the value of $\epsilon$ is fixed, $D_T$ is a universal function of the scaled frequency and wavenumber. Thus, one of two general scaling relations for the CML is given by:

$$\lambda \sim d \qquad (5)$$

Since d may become small, short-wavelength operation presents no difficulty in principle.

GAIN

The dimensionless coupling strength for the beam in the resonator may be defined in terms of an active Q:

$$\frac{1}{Q_b} = \frac{\int \underline{J}^* \cdot \underline{E} dv}{2\omega E} \qquad (6)$$

where $\underline{J}$ is the modulated current produced by the electric field $\underline{E}$ and E is the energy stored in the resonator. At small to moderate current densities, the gain during the time ($\tau$) it takes a single electron to transit the resonator (length L, $\tau = L/c\beta_o$) is given by:

$$g = -\frac{\omega\tau}{Q_b} \qquad (7)$$

where the negative sign in eq. (7) occurs because gain is positive in regions where $1/Q_b < 0$. The evaluation of eq. (6) can be approached in a variety of ways. The anticipated e-beam energy is modest and hence a strong axial magnetic field will be used to render the electron motion effectively one-dimensional. It is a simple matter to use particle equations of motion, in the vacuum fields of the guide, to evaluate the energy lost per electron. The numerator of the RHS of eq. (6) can be re-expressed as:

$$\frac{1}{2}\int \underline{J}^* \cdot \underline{E} dV = \frac{mc^2}{e}\int_{beam} dA J_b(r_b)\delta\gamma(L,x_o) \qquad (8)$$

where $J_b(r_b)$ is the cross-section of the beam and $w_q(L)$ is the phase-averaged electron energy loss. The energy input rate follows directly. The gain per Pass for a beam of width $s_{by}$, traversing a resonator with mode width w, becomes:

$$g = \frac{J_{bo}L^2}{(mc^3/e)} \cdot \frac{\sigma_{by}}{w} \cdot \frac{L}{d} \cdot f_c g_o \qquad (9)$$

where $J_{bo}$ is the peak beam current density, ($mc^3/e = 17$ KA) $f_c$ is a coupling factor, d is the film thickness, and $$g_o = \frac{8\pi(\gamma^2 - \gamma_T^2)}{\beta^5\gamma^7} \cdot \frac{kdF_R(\kappa L)}{\left[1 + \frac{kd}{\gamma}\left(1 + \frac{\epsilon}{\gamma^2}\right)\right]} \qquad (10)$$

contains all of the factors in the gain which scale in a universal manner along $D = 0$. Synchronism, ($\beta = \omega d/ckd$, $\gamma = 1/(1-\beta^2)$ is assumed, and $\gamma_T = (\epsilon/(\epsilon - 1))$ is the relative energy at the Cerenkov threshold.

Figure 5:
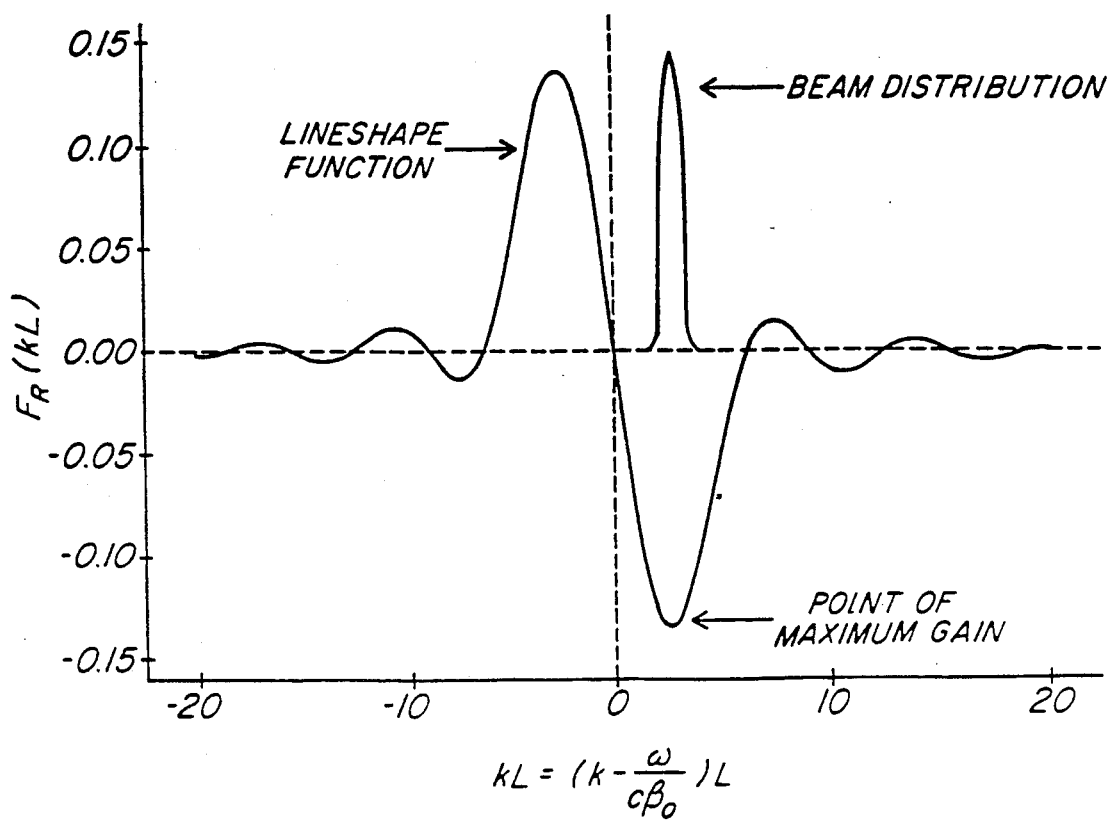
FIG. 5 is a graph showing the single particle lineshape function vs. phase mismatch, for a free electron laser according to the invention.
Figure 6:
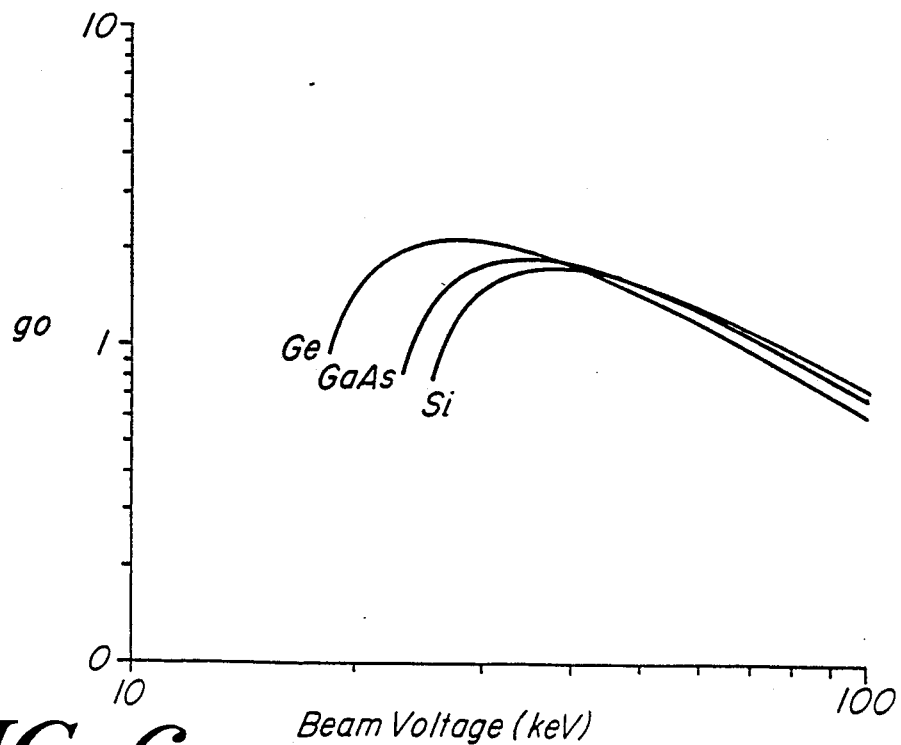
FIG. 6 is a graph showing gain vs. beam energy for germanium, gallium arsenide, and silicon in a free electron laser according to the invention.

The gain line shape, $F_R(kL)$ FIG. 5, is given by $$F_R(\kappa L) = \frac{2(1 - \cos\kappa L) - \kappa L \sin\kappa L}{(\kappa L)^3} \qquad (11)$$

where $$\kappa L = \left(k - \frac{\omega}{c\beta_o}\right)L \qquad (12)$$

is the relative slippage between the wave and a beam electron. The gain peaks at $kL = 2.34$ and $F_R = 0.135$ at that point. Plots of the value of $-g_o$ at the point of maximum gain are displayed on the same axes as the tuning curve (FIG. 6).

BEAM QUALITY

The width of the gain line determines the minimum acceptable energy spread. A schematic illustration of a beam distribution is shown on FIG. 5. It is clear from this sketch that all dephasing effects, when converted to equivalent phase spread, must satisfy $$\overline{k\delta v L/c\beta_o} < \epsilon L \qquad (13)$$

where $\delta v$ is an equivalent parallel velocity spread. If the latter results from energy spread, eq. (13) may be converted to:

$$\frac{\delta V_{beam}}{V_{beam}} < \frac{\lambda}{L}(\gamma - 1)^{1/2}(\gamma + 1)^{3/2} \qquad (14)$$

COUPLING

The function $f_c$, which appears in the expression for g, is a dimensionless measure of coupling. It depends upon the beam cross-section and the mode profile. As a first approximation it is convenient to assume that the distribution is rectangular with thickness $\sigma_{bx}$ and a lower edge located a distance $\delta$ above the surface. For this case:

$$f_c = e^{-\mu\delta}(b\ 1 - e^{-\mu c}) \qquad (15)$$

where the dimensionless coupling parameters.

$$\mu_{c,\delta} = \frac{4\pi(\sigma_{bx}\ or\ \delta)}{\lambda\beta\gamma}, \qquad (16)$$

come from the values of $2q\delta$ and $2q\sigma_{bx}$ evaluated at synchronism.

A gap size $\delta$, which yields $\mu\delta = 1$, reduces the gain by a factor $\epsilon - 1 = 0.368$. Values of $\delta$, which must be maintained in order to meet the condition $\mu\delta = 1$, are listed in Table 1. The presence of a gap does lead to a decrease in the gain, but two mitigating circumstances must be noted. First, overall gain is high and some decrease is tolerable. Second, very small gap size (including some beam intercept) is achievable in practice. The factor $\mu_c$ is a dimensionless measure of the wave evanescence over the beam profile. In the present design, a limit of $\mu_c \leq 4$ will be assumed and these values are also listed on Table 1. The constraints implied by eq. (16) constitute the second general scaling relation for CML design.

THE RESONATOR

Before treating specific materials and cavity designs it is useful to establish their effect on CML operation. Consider a dielectric waveguide of length L with material losses $\alpha_m$ and end mirrors characterized by reflectivities $r_1$ and $r_2$. The system must have sufficient gain to overcome losses associated with propagation in the guide, or $$\alpha_{thresh} = \frac{1}{2}\left(\alpha_m - \frac{1}{L}\ln(r_1 r_2)\right) \tag{17}$$

This can be written in terms of a cavity Q[7] as $$\frac{1}{Q_{cav}} = \frac{1}{Q_{diel}} - \frac{1}{Q_{mirror}} = \frac{\alpha_m v_g}{\omega} - \frac{v_g}{2L\omega}\ln(r_1 r_2) \tag{18}$$

where $v_g$ is the group velocity, $d\omega/dk$. The group velocity and operating frequency $\omega$ are dictated by the excited mode, and are taken from the dispersion relation. The active beam quality of eq. (6) must exceed that of the cavity for lasing. Minimizing $1/Q_{cav}$ delineates the resonator-dependent areas of concern. The geometric design implications are that L should be large relative to $\lambda$. It is also clear that $r_1 r_2$ should be as high as possible while still permitting output coupling. Finally the material losses should be small. Thus, the four main resonator design issues are: macroscopic dimensions, mode confinement, mirror reflectivity, and material losses.

MACROSCOPIC DIMENSIONS

Figure 7:
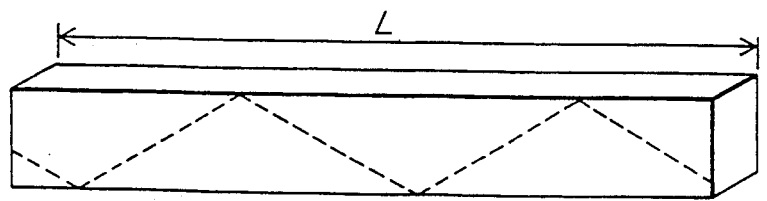
FIG. 7 is a schematic diagram depicting a semiconductor resonator structure in accordance with the invention.

The infinite planar resonator dispersion relation was shown in FIG 3. Including finite resonator dimensions (FIG. 7) in the y and z directions imposes additional restrictions on the dispersion[8]. For a guide of width w and length L, the axial wavenumbers of eq. (2) become $$q^2 = \left(\frac{\omega n_1}{c}\right)^2 - k_{nm}^2 \tag{19}$$

$$p^2 = k_{nm}^2 - \left(\frac{\omega}{c}\right)^2$$

where $k_{nm} = n\pi/L + \pi/w$. These solutions are longitudinal section magnetic or $LSM_{1mm}$ modes. They reduce to the more specific $TM_{1n}$ solutions when the problem is less constrained. The resultant dispersion is a subset of the one discussed earlier, only now the allowed k's are quantized. Since synchronism must be achieved between the beam and mode phase velocities, the discrete k's are problematic only at large $\lambda/b$ or $\lambda/L$ values.

The propagating wave is more accurately described by a Gaussian mode than by a plane wave[9]. It is realistic to assume Gaussian-type solutions in the y-z Plane. These are characterized by a minimum spot size with diameter $w_O$. The waist at a distance z is defined by $$w^2(z) = w_0^2\left[1 + \left(\frac{z\lambda}{\pi w_0^2}\right)^2\right] \tag{20}$$

The minimum $w_o$ is obtained from $\partial w(z)/\partial w_O = 0$, $$w_o\min = \sqrt{\frac{\lambda L}{2\pi}} . \tag{21}$$

This mode waist gives a good estimate of the transverse extent of the optical mode. A well-confined, stable resonator mode should have its waist at resonator center (z=O). To eliminate diffraction effects, the end aperture must physically accommodate the beam divergence. Thus, a minimum resonator width is established;

$$w \geq \sqrt{\frac{L\lambda}{\pi}} . \tag{22}$$

MODE CONFINEMENT

The degree of mode confinement in the x-z plane can be obtained by invoking the ray optic picture of guided wave propagation. A guided ray propagates along the resonator via successive reflections at the two interfaces. A schematic of this ray is included in FIG. 7. When the critical angle for total internal reflection (TIR) is satisfied at both interfaces, the mode is well confined. In reality, the wave Penetrates into the region above the guide a distance on the order of $1/q$. For TM modes, the effective mode width is $$d_{eff} = d + \frac{1}{qr} \text{ where } r = \left(\frac{ck}{\omega n}\right)^2 + \left(\frac{ck}{\omega}\right)^2 - 1 \tag{23}$$

A well-confined mode has $d_{eff}$ very close to d; however, the CML relies on the evanescent tail above the guide for electron/mode coupling.

MIRRORS

Figure 8:
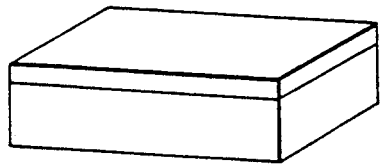
FIG. 8 is a schematic diagram depicting a mirror configuration useful in a practice of the invention, in which slight curvature is introduced to match the Gaussian mode wavefront and improve transverse confinement.
Figure 9:
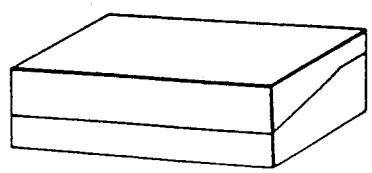
FIG. 9 is a schematic diagram depicting a mirror configuration useful in a practice of the invention, in which adiabatic confinement of the evanescent mode ensures that the end mirrors reflect the entire mode.
Figure 10:
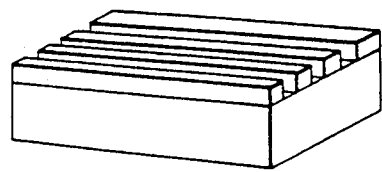
FIG. 10 is a schematic diagram depicting a square profile distributed Bragg reflector useful in a practice of the invention, in which alternate cross-sections and varying index materials exhibit similar pass and stop bands that are employed as a reflector.
Figure 11:
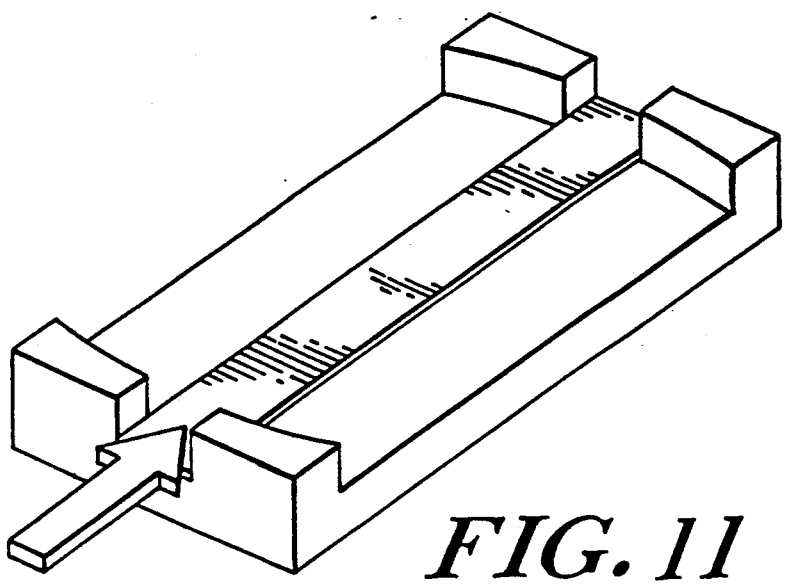
FIG. 11 is a schematic diagram showing a free electron laser beam/resonator configuration in accordance with the invention.

A high resonator quality factor relaxes the material loss and laser gain requirements of the FEL. One way of improving the Q is to increase the mirror reflectivities. Only integral mirrors are treated. They eliminate the losses associated with coupling out of the guide while offering the advantage of mechanical integrity. Several different mirror designs are shown in FIGS. 8, 9 and 10 and discussed below. The flexibility of mirror design enables us to choose the reflectivities we require for optimum CML performance.

The simplest Fabry-Perot cavity is formed by cleaving and polishing the ends of the dielectric resonator. The dielectric/air interface can provide sufficient reflectivity, r, to achieve threshold. Typical r values are about 30–40% for Si, GaAs and Ge. If an improved r is desired, metal can easily be evaporated onto the end face. The skin depth for radiation penetrating into metal is $\delta = (\lambda/\pi\mu c\sigma)^{\frac{1}{2}}$ in MKS units[10]. For aluminum in the FIR this corresponds to the range 10–160 nm. A 200 nm layer of Al should provide near 100% reflection over the entire range of interest.

Curving the end-mirrors (FIG. 8) improves mode confinement, eliminating the "walk-off" associated with planare mirrors. We assume a Gaussian beam with a minimum waist at resonator-center and match its radius of curvature, R. For the most confined mode, $$R\left(z = \frac{L}{2}\right) = z\left[1 + \frac{\pi w_0^2}{\lambda z^2}\right]_{w_0=w} = L \quad (24)$$

This is the condition for a confocal cavity.

Since some of the radiation is not confined to the guide it is naive to assume that all the guided radiation is reflected by the end face. If the guide is thickened adiabatically (FIG. 9), the guided wave is slowed, and the evanescent tail is decreased. The mode is Pulled into the dielectric where it is more effectively reflected. Note that the reverse is accomplished if the guiding layer is thinned adiabatically: the wave is accelerated and the evanescent tail grows until the entire wave is launched into the vacuum. We quantify "adiabatic" by assuming that the change occurs over a minimum of 10 wavelengths. This is a practical distance for the entire FIR region.

Another possible reflector is a periodic grating which could be fabricated on the resonator ends (FIG. 10). It is known as a distributed Bragg reflector (DBR). Its dispersion relation exhibits stop and pass bands; where there is no solution for a given frequency, the wave cannot propagate and will be reflected.

MATERIALS

In traditional Cerenkov FELs the guiding medium has been a low-index dielectric. The threshold energy required for lasing, $V_T$, is determined by the dielectric constant. The gain usually peaks at about twice that voltage. A higher index reduces the voltage required to reach the Cerenkov threshold and also reduces the voltage necessary to operate at a given wavelength. This reduction in energy facilitates the search for an appropriate electron beam source. It also reduces the charging problems associated with high voltage beams. The choice of a semiconductor guiding layer grew from the search for a higher index material, but has become an engineering advantage. Techniques common to integrated circuit and micro-mechanics structure fabrication provide the basis for constructing the resonators proposed here.

We intend to tailor the material for desired applications. Because semiconductor resonators have not been studied previously in this context, and because some salient points are unearthed, the mechanisms for loss in semiconductors are discussed below.

LOSSES

In the FIR, radiation and scattering losses are minimal, so we need only consider absorption. Semiconductor absorption is dominated by inter-band absorption. The threshold wavelength for this is given by $$\lambda_g[\mu m] = 1.24/E_g[eV] \quad (25)$$

This gap wavelength separates the absorption into two regions. The first corresponds to $\lambda < \lambda_g$ where intrinsic carriers are excited across the bandgap. This is a region of strong absorption which is avoided by a judicious choice of material. The second, $\lambda < \lambda_g$, is characterized by free carrier absorption, lattice absorption, intra-band absorption, and defect of dopant absorption. Since FIR radiation satisfies this condition in Si, GaAs, and Ge, we need to address each of these absorption mechanisms.

Free-carrier absorption is a consideration at any temperature in the FIR. Energy is lost as free carriers are first excited, and then transfer energy to the surroundings via scattering[13]. The Classical Drude theory expression for free-carrier absorption is:

$$\alpha_{fc} = \frac{Nq^2\lambda^2}{8\pi^2 m^* n c^3 \tau} \quad (26)$$

where N is the free carrier concentration, $\lambda$ is the lasing wavelength, $m^*$ is the free carrier effective mass in the semiconductor, n is its index of refraction, and $\tau$ is the scattering lifetime. This absorption is less significant at low temperatures and short wavelengths.

Lattice absorption must also be considered for infrared wavelengths at most temperatures[14]. It will be increasingly important for very lightly doped semiconductor resonators at wavelengths in the vicinity of 10 $\mu$m, where free-carrier absorption has diminished. Excitation of semiconductor resonator lattice phonon modes via coupling to the beam or the emitted laser radiation is clearly possible in crystalline resonators, and is proportional to a power of the lasing wavelength. The exponent of $\lambda$ can vary between 1.5 and 2.5, depending upon whether acoustic or optical phonon modes are excited. Polycrystalline or amorphous resonators may be necessary to overcome crystalline lattice absorption limitations.

Intra-band absorption can be important in p-type semiconductors. As with free-carrier absorption, the absorption coefficient is Proportional to the free hole concentration. However, this mechanism relies on penetration of the hole quasi-Fermi level into one or more of the valence bands. Such penetration indicates degenerate doping, which high-resistivity materials avoid. In n-type semiconductors, absorption is usually below the limit of free-carrier absorption, except at wavelengths a few microns longer than the direct band-gap absorption edge.

Impurity absorption[18] will be unimportant at temperatures near 300K. However, near 77K, freeze-out of free carriers onto dopant impurity sites will allow the reverse process to occur via absorption of photons with energy near the impurity ionization energy. Thus, if temperature lowering is used as a means to control dielectric constant, this mechanism will need consideration.

An ideal resonator would have low losses in the FIR and a tunable dielectric constant $\epsilon$. Clearly both are attainable with a semiconductor resonator. To reduce losses we should choose a high resistivity material since the resistivity is a good indication of the number of free carriers available for absorption. It is also possible to freeze out the carriers to reduce absorption. Eq. (26) indicates that the index (or equivalently $\epsilon$), depends on temperature, carrier concentration, and wavelength. Clearly there is potential for control of the desirable properties given careful consideration of the material preparation.

DESIGN CHARACTERISTICS OF THE CML

The general theory of the Cerenkov laser and the further design constraints imposed by resonator optics fix the characteristics of the CML. First, since the relative dielectric constants of Si, GaAs, and Ge are 11.8, 12.9, and 16.0, the Cerenkov threshold energies $$V_T = (\gamma_T - 1)mc^2 \quad (27)$$

are 23.1, 21.0 and 16.8 kV respectively. The relative gain, $g_o$, peaks at about 2VT and the coupling factor, $f_c$, will tend to further shift the maximum point toward higher energies. Thus, overall, operation with $V_b = 50-100$ kV is anticipated. Electrons in this energy range can be produced either with a conventional cathode material such as $LaB_6$, or a high-brightness field-emitting cathode structure. In the first case, achieving suitable current densities would require approximately 10:1 compression of the beam thickness. If a high-brightness cathode is employed, very little beam compression would be needed. Both options lie within the range of parameters that typify modern low-total-current, high-current-density, high-brightness (low energy spread) electron gun design.

In order to further constrain the design, it is useful to estimate the parameter values needed to fix g, the gain per pass, at $g = 1$. Assuming that a round beam is employed and matched to the resonator waist:

$$\sigma_{by} = \sigma_{bx} \quad (28a)$$

$$w \sim \sqrt{\frac{\lambda L}{2\pi}} \quad (28b)$$

When the energy and coupling parameter are fixed, the overall gain scaling is given by:

$$g \sim \frac{J_{b0} L^{5/2}}{\lambda^{\frac{3}{2}}} \quad (29)$$

If we fix $L/\lambda$ at, say, $10^2$, then at $V_b = 100$ kV the current density required to achieve $g = 1$ is $$J_B(g = 1) = \frac{463}{L^2} \, A/cm^2 \quad (30)$$

Values for $J_b$ are tabulated in Table 1. The current density at 100 μm is high, but within attainable limits for well-focussed short-path beams. Furthermore, if the $L/\lambda = 10^2$ limit is increased, the required current density drops quickly. When the constraint $\mu_c = 4$ is also enforced, the total beam cross-section scales with $\lambda$ and the total current is $I_b = 360$ μA. It will be the same for all cases listed in Table 1.

The maximum allowable energy spread is also the same for all cases. When $\lambda/L = 10^{-2}$, the electron voltage spread is $(\delta V_b/V_o) = 2.6\%$. Energy spreads which are a factor of 5 to 10 lower than this are possible in practice, and thus this constraint is modest.

It is also interesting to consider the potential operating efficiency. A single-particle calculation indicates that a typical electron will lose between 1 and 10% of its energy. This elementary one-dimensional estimate does not predict where in the beam profile the saturation profile will be located. Experience with similar devices, however, indicates that the single-particle estimate is typical. It is also possible in principle to operate the CML with a collector which is biased near the cathode potential. In this case, the overall efficiency can be considerably above the electronic efficiency $[\delta\gamma/(\gamma - 1)]$.

Alternate macroscopic configurations would enhance the gain and efficiency. One possibility is the klystron. It consists of two short film sections, one to initiate velocity modulation and a second to extract energy from the bunched beam. The drift section separating the films can take a number of forms including a cut-off guide, lossy guide, or the introduction of dispersive magnetic fields. A wedged film can be used in any configuration to slow the phase velocity of the wave to match the electron loss and thus enhance the electronic efficiency.

The use of a semiconducting film lends itself to even more innovative designs. The advantage of wavelength tunability has been one of the motivating forces behind FEL development. The coefficient for ε-tuning in the range of interest is approximately $\Delta\lambda/\Delta\epsilon = 0.02$. The dielectric constant for semiconductors can be tuned via a number of mechanisms including applying a voltage or changing the temperature. Photolithography allows for essentially limitless (on the CML scales) implementation of resonator designs which we plan to develop in the future.

TABLE 1

| $\lambda$ (μm) | L (cm) | $\delta$ (μm) | $\sigma_{bx}$ (μm) | $J_b$ (A/cm²) |
|---|---|---|---|---|
| 100 | 1 | 2.2 | 9 | 460 |
| 200 | 2 | 4.4 | 18 | 115 |
| 500 | 5 | 11 | 44 | 18.4 |
| 1000 | 10 | 22 | 88 | 46 |

CML design specifications needed to maintain $g = 1$ for several wavelengths. We set $V_b = 100$ kV and $L/\lambda = 10^2$. The beam—film gap ε and the beam thickness are calculated for $\mu_g = 1$ and $\mu_c = 4$.

SEMICONDUCTOR MATERIALS

In general, the optical properties of typical semiconductor materials (Si, Ge and GaAs) in the submillimeter to infrared Portion of the spectrum are ideally suited for the SFCL application. Their indices of refraction are relatively high (3.5–4) and published loss rates are acceptably low ($\alpha_{bulk} < 0.15$ cm$^{-1}$).

RESONATORS

Figure 12:
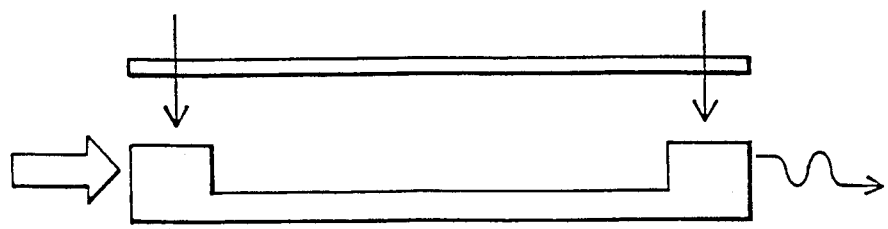
FIGS. 12A and 12B are two views of a resonator constructed in accordance with the invention.
Figure 12B:
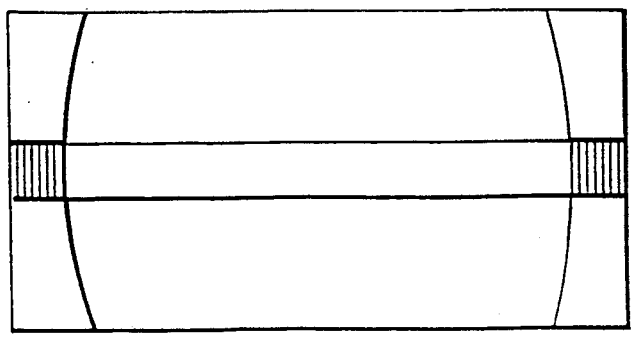

The invention can be practiced with a number of resonator designs, as depicted in FIGS. 11 through 17B. The resonator in FIGS. 11, 12A and 12B formed by a parallel plate waveguide which is terminated with cylindrical section mirrors. This structure supports planar-cylindrical Gaussian modes. A narrow semiconductor strip loads the central portion of the resonator and the beam enters and exits through apertures in the mirrors. If needed, additional feedback in the form of Bragg reflector sections may be added in the mirror apertures. The addition of the strip grating to the open parallel-plate resonator adds a space harmonic modulation to the cavity modes and the slow-wave components of these fields couple the bema to the resonator. If needed, Bragg sections and an additional top surface film can also be included in these Phase One SFCL resonators.

The film thickness is typically a factor of 5–15 smaller than the desired operating wavelength. In the spectral region selected for the preliminary experiments, these "films" can actually be constructed from commercially-available wafers. Thinner pieces will require some surface polishing after mounting in the resonator. At the shorter end of the spectral range of interest (10's of μm), films will be grown directly on substrates.

Figure 13:
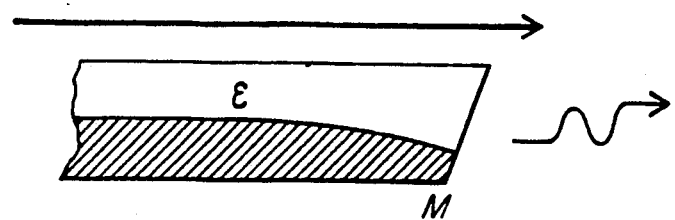
FIG. 13 depicts a tapered surface guide useful in one practice of the invention.
Figure 14:
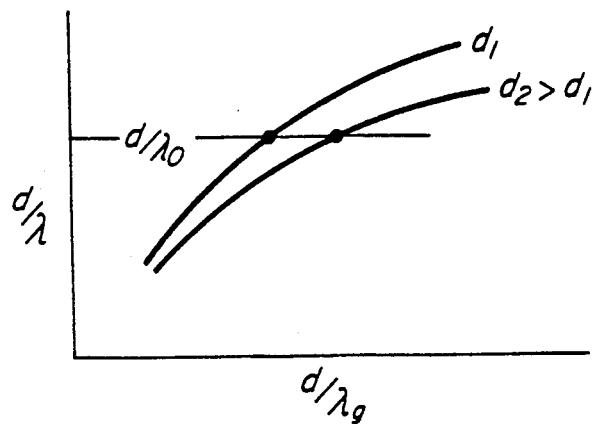
FIG. 14 is a graph depicted the dispersion effects of the tapered guide of FIG. 13.

Advanced "integrated" resonators can take a wide variety of forms. One example is shown in FIG. 13. A film is tapered in such a way that it is thicker on the end, and after a suitable transition length, it is terminated with a reflecting surface (M). The effect of the taper on The dispersion relation is also indicated schematically on the FIG. 14. As the film thickness is increased, the guide wavelength decreases, which in turn draws a greater fraction of the mode into the film where it is then reflected.

Figure 15:
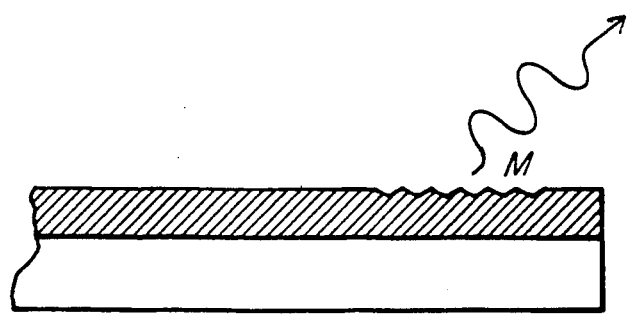
FIG. 15 is another embodiment of a resonator in accord with the invention, utilizing a semiconductor film with Bragg mirror.
Figure 16:
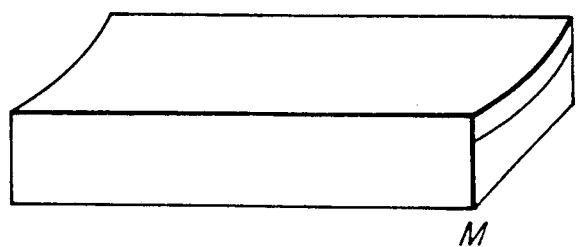
FIG. 16 is another embodiment of a resonator in accord with the invention, utilizing a semiconductor film having a trough guide section.
Figure 17A:
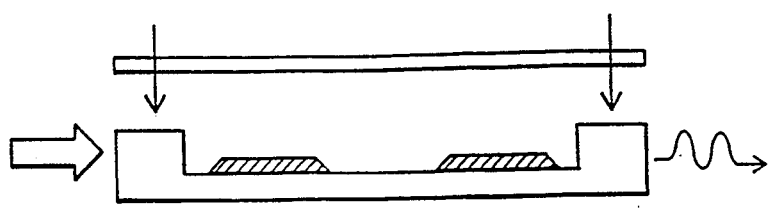
FIGS. 17A and 17B show a klystron-type resonator/beam configuration in accord with the invention.
Figure 17B:
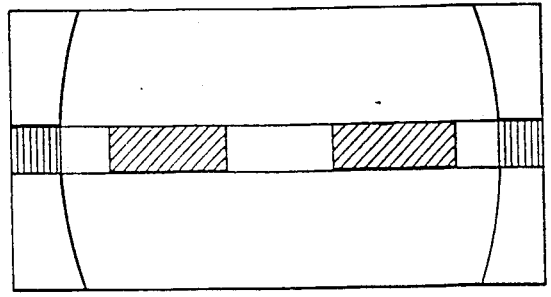

Two additional options for second-generation resonators are shown in FIGS. 15 and 16. In one of these cases, (FIG. 15), the mode is launched from the film surface by a short section of grating and in the other (FIG. 16), transverse containment is provided by a trough configuration. When a grating section is employed as a launching structure, additional feedback can be obtained from external mirrors. The trough section guide can be terminated with integrated mirrors.

Other resonator designs can be segmented (or klystron-like) structures. Examples are shown on FIGS. 17A and 17B. The segmented structure provides separate sections for velocity modulation and energy extraction. Thus the length of high-precision film can be reduced. Gain will be enhanced and tapered output couplers may be used to increase the electronic efficiency.

Exemplary operating parameters are listed on Table 4.1.

[TABLE 4.1]

| Pulse Modulator | |
| --- | --- |
| Voltage: | 10–150 kv |
| Current (Peak): | 10 A |
| Current (Typical): | 2–5 A |
| Pulse Length: | 2–4 $\mu$sec |
| Repetition Rate: | 1–5 Hz |
| Beam Formation and Transport | |
| Cathode: | Barium Oxide Coated Dispenser Cathode |
| Anode: | Carbon Ring |
| Emittance Selector: | 3.6 × 7.2 mm$^2$ |
| Axial Guide Field: | 3–5 KG |
| Base Pressure: | 1 × 10$^{-6}$ Torr |
| Detectors: | |
| IN53 Detector Diodes | |
| He-Cooled InSb and Ge:Ga semiconductors | |
| Wavelength: | |
| Cutoff Filters | |
| Fabry-Perot and Michaelson Interferometers | |
| Grating Spectrometers | |

In another embodiment of the invention, the resonator can incorporate a grating strip in place of the semiconductor strip to couple the beam to the resonator. Such a structure is referred to herein as a grating-coupled oscillator ("GCO").

Figure 20:
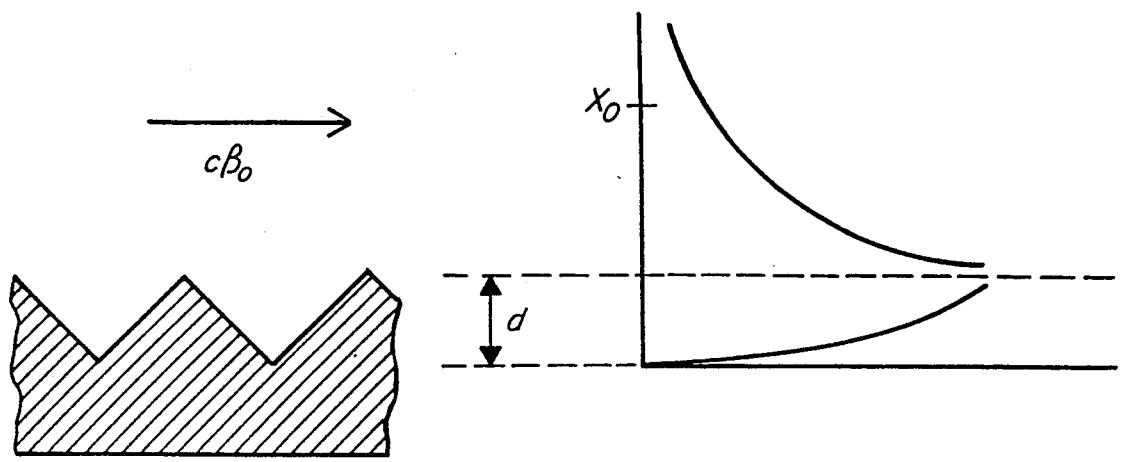
FIG. 20 is a schematic diagram depicting a grating coupled oscillator (GCO) laser mechanism, and particularly the relationship between an electron moving over a surface and the z-component of the electric field.
Figure 21:
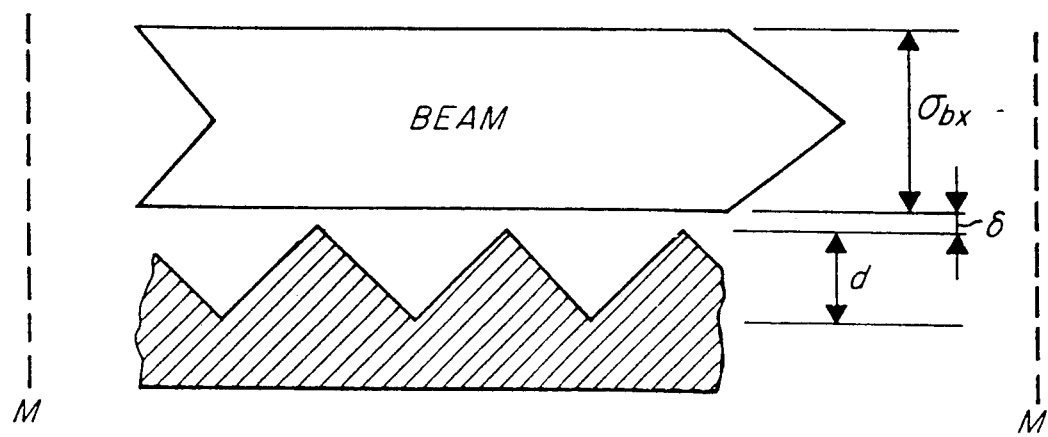
FIG. 21 is a schematic diagram depicting the relationship between the beam and the grating cross-section.

The basic GCO geometry is depicted in FIGS. 20 and 21. In particular, FIG. 20 illustrates the relationship between a beam electron and the axial component of the electric field. The electron moves over the surface at a distance $x_o$ above the top of the grating and couples "synchronously" to space harmonics with nearly the same velocity. FIG. 21 shows an electron beam having a thickness (sigma)$_{bx}$ located a distance (delta) above the surface of the grating. The factors which govern coupling strength may be summarized by two dimensionless parameters which relate the dimensions to the beam energy and velocity. The transverse wavenumbers which determines the evanescence scale depends only upon the axial wavenumber of the space harmonic (K) and the operating (angular) frequency (w). It is given by $$q = \sqrt{k^2 - \frac{\omega^2}{c^2}} \qquad \text{(Eq. 31)}$$

wherein c is the speed of light. Coupling peaks near synchronism:

$$\omega = ck\beta_o \qquad \text{(Eq. 32)}$$

and hence $$q = \frac{k}{\gamma_0} \text{ or} \qquad \text{(Eq. 33)}$$

$$q = \frac{k}{\gamma_0} \qquad \text{(Eq. 34)}$$

Dimensionless coupling parameters given by $$\mu_b = \frac{4\pi\sigma_b}{\lambda\beta_0\gamma_0} \text{ and} \qquad \text{(Eq. 35)}$$

$$\mu_\delta = \frac{4\pi\delta}{\lambda\beta_0\gamma_0} \qquad \text{(Eq. 36)}$$

are thus defined. When the beam profile in the direction normal to the grating may be approximated by a rectangle, the function $$F_c(\mu_b,\mu_\delta) = e^{-\mu_\delta}(1 - e^{-\mu_\delta}) \qquad \text{(Eq. 37)}$$

describes the coupling.

In cases where the rectangular approximation is not appropriate, a numerical evaluation of the product field and beam profiles will still depend upon the parameters defined by Equations 35 and 36.

The operating wavelength of the GCO is determined by Equation =and by the dispersion relation of the bound modes on the grating. The dispersion relation itself will be a universal self-similar function of the grating period and the other grating parameters:

$$D\left(\frac{\omega\iota}{c}, k\iota, \frac{d}{\iota}, \frac{s}{\iota}, \frac{b}{\iota}\right) = 0 \qquad \text{(Eq. 38)}$$

Tuning curves are thus defined by the function relation $$D_T\left(\frac{\omega\iota}{c}, \frac{w\iota}{c\beta_0}, \frac{d}{\iota}, \frac{s}{\iota}, \frac{b}{\iota}\right) = 0 \qquad \text{(Eq. 39)}$$

A general scaling relation $$\lambda \sim \iota \qquad \text{(Eq. 40)}$$

thus follows. A detailed derivation of the gain function will not be presented here. However, it is useful to note that gain peaks at the points on the dispersion near to $$k\iota = n\pi \qquad \text{(Eq. 41)}$$

and thus the threshold condition is a minimum when $$\frac{1}{\lambda} \sim \frac{n}{2\beta\iota} \qquad \text{(Eq. 42)}$$

Figure 22:
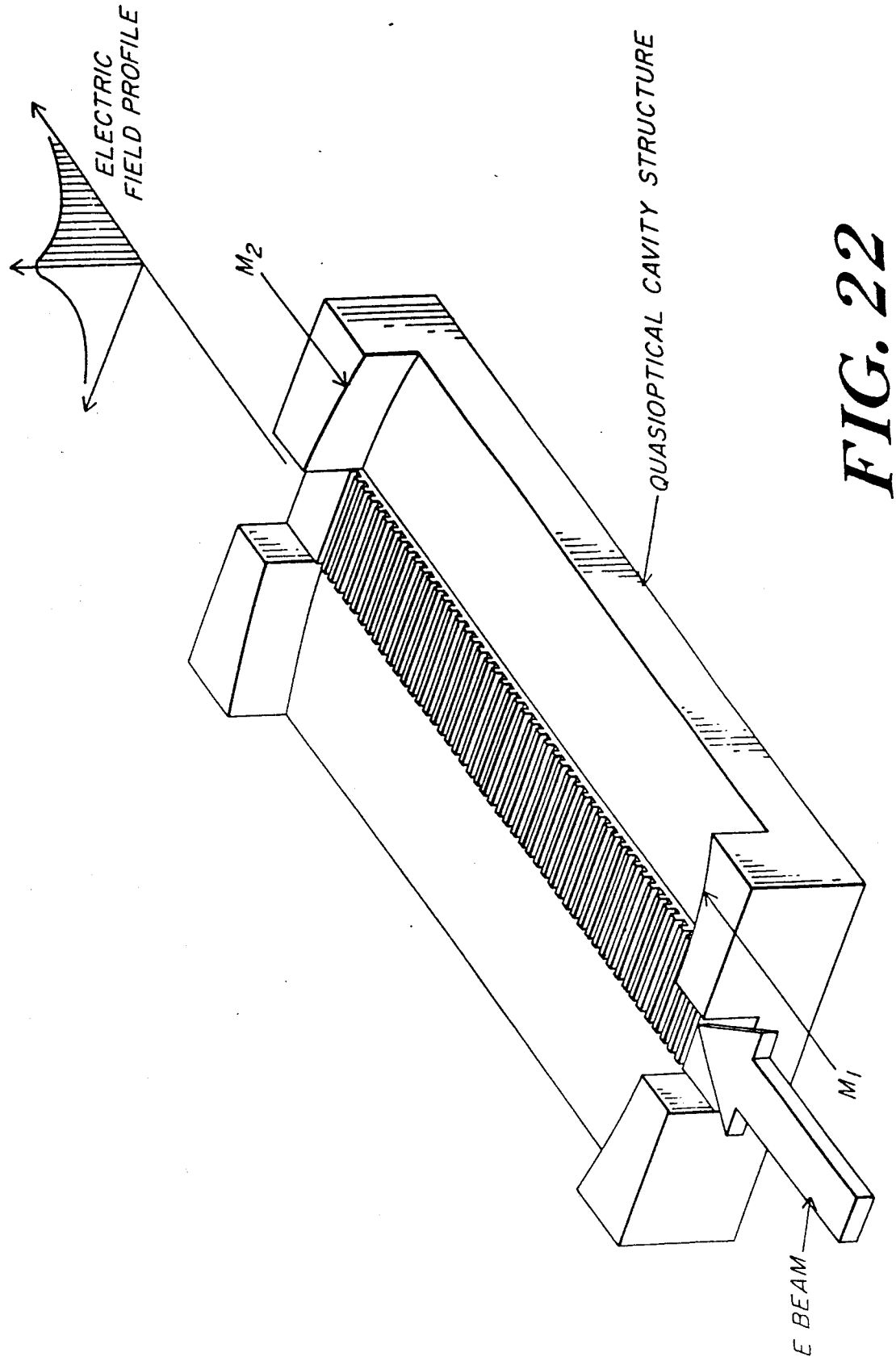
FIG. 22 depicts a GCO oscillator in accord with the invention.
Figure 23:
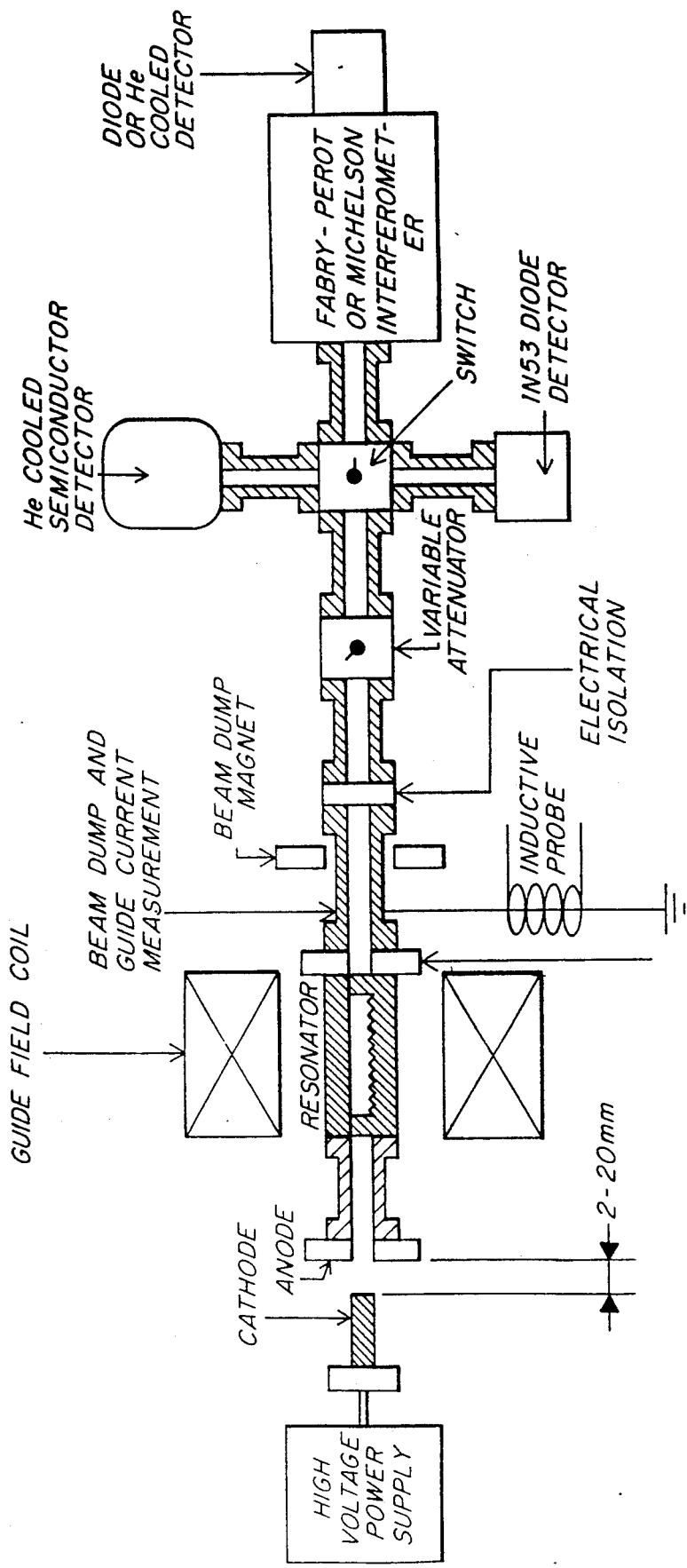
FIG. 23 is a schematic diagram depicting a GCD configuration in accord with the invention.

A perspective view of the GCO resonator configuration is shown in FIG. 22. A narrow strip of grating loads the center region of a resonator formed by parallel-plate waveguide and cylindrical section mirrors. The beam enters and exits through apertures in the mirrors and the radiation exists along the beam. After exiting the resonator, a transverse magnetic field deflects the electron beam and the radiation proceeds along a light pipe into a diagnostic region. A complete experimental configuration is depicted in FIG. 23. RF-accelerator-produced beam may play a critical role.

OTHER BEAM SOURCES

Figure 18:
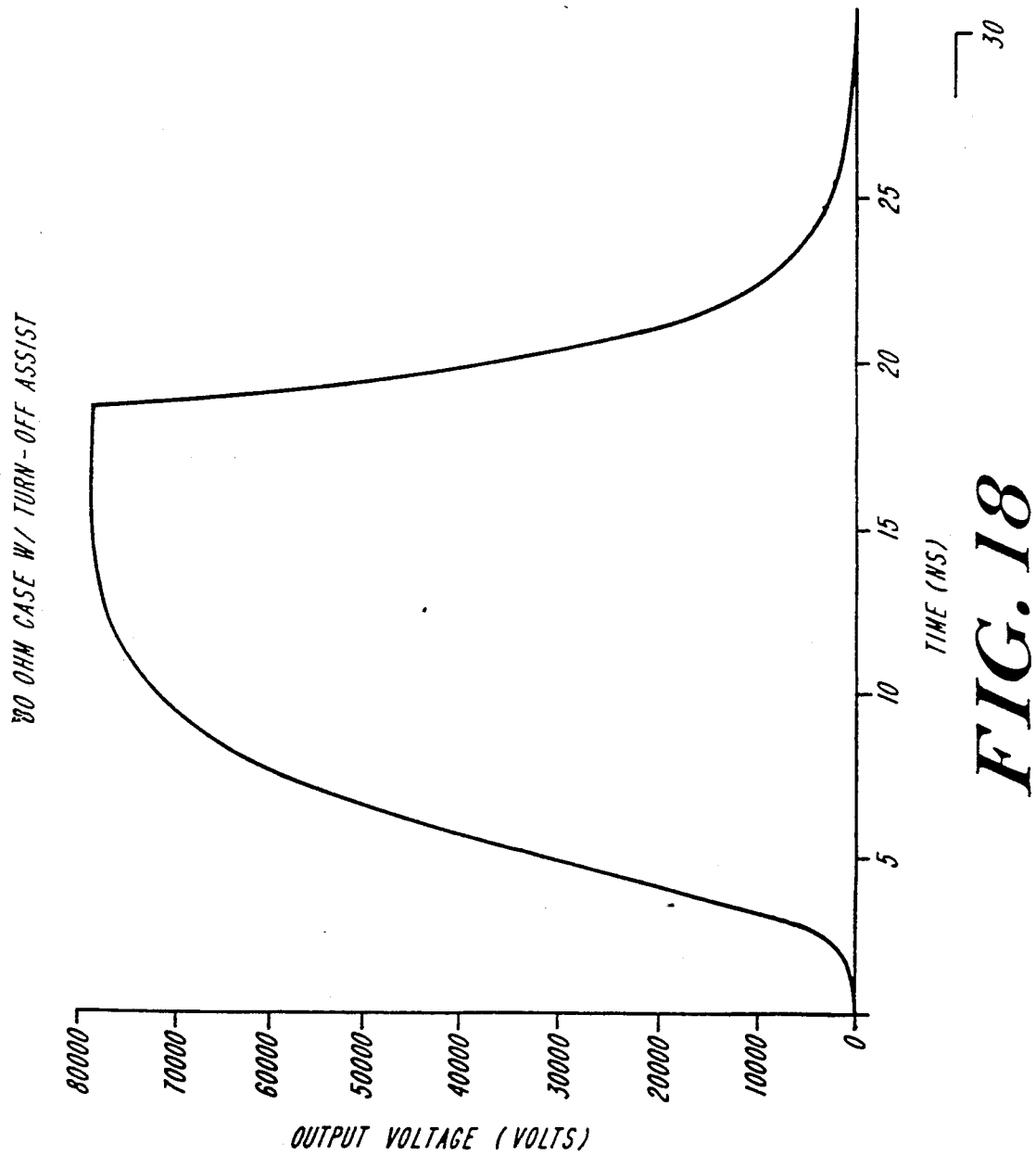
FIG. 18 is a graph depicting a high-voltage output pulse from an electron beam source useful in one practice of the invention.

In certain cases, a short pulse with higher peak power is a more desirable configuration (transient spectroscopy, nonlinear studies, etc.). As in the case of dc supplies, recent advances in higher-voltage components and pulse-power technology have led to very compact, and convenient-to-use devices. Systems specifications for one such device are listed in Table 4.2 and a simulated high-voltage output pulse for the same machine is shown in FIG. 18. The peak e-beam power from a system of this type will be in the 500 KW – 1 MW range and radiation output-levels in the multi-KW–100 KW (pulsed) may be expected.

The SFCL has particular advantages when used in conjunction with electron beams of relatively low energy. It is thus important to carefully delineate the circumstances under which an

TABLE 4.2

| | | |
|---|---|---|
| Pulse Length (Flat-top) | 10 ns | 10–20 ns |
| Output voltage | 75 kV | 150 kV |
| Output volts - w/long tail | 90 kV | |
| Load Current | 10 A | 20 A |
| Pulse Current | 3% | 1% |
| Rise Time | 5 ns | 5 ns |
| Fall Time | 10 ns | 10 ns |
| Load Capacitance | 30 pf | 30 pf |
| Switch/Load Inductance | 150 nh | 150 nh |
| Cathode Power Available | 200 W | 500 W |

Moving toward a higher operating beam energy has two primary consequences. First, the parameters $\lambda g$ and $\mu b$ and $\gamma$ both scale inversely with $\mu b = 4$ and hence if beam size is fixed, the wavelength region in which good coupling may be maintained decreases accordingly. Practice indicates that $\mu b = 4$ is an optimum coupling regime (submm-wavelength carcinotrons operated at much larger values of $\mu$). The ratio of critical wavelength to beam thickness for $\mu b = 4$ is listed on Table 4.4. In principle, the visible region of the spectrum will become accessible to the SFCL type of device.

A second consequence of increasing the beam energy is a decrease of gain (approximately as the ratio of the initial and final energy to the fifth power). This will result in a substantial change in final energy is in the 5 Mev range. It can be offset in part by an increase in the interaction length and in part by an increase in beam current density. The latter can also be substantial. Unlike the microtron, the modern microwave-produced beams are capable of attaining $J_b$ values in the 1–2 KA/cm$^2$ range. Thus, in general, the compact RF-accelerator-driven SFCL is a potential short-pulse, high, peak-power (MW), FIR-IR source. Although the accelerator is more complex and cumbersome to use than the pulsed and cw beam generators mentioned earlier, it does offer some unique advantages. It should also be noted that the accelerator energy required is still modest in comparison with alternate free-electron lasers in which undulator coupling is employed.

The RF-accelerator-driven SFCL experiments are intended to provide general assessment of this operating mode, and in particular to provide a basis for designing visible-wavelength SFCL experiments.

FREQUENCY STABILITY

Among the applications of an SFCL, many fall into the general category of "spectroscopy". In these cases, the spectral quality of the source is of paramount importance. The characterization of this parameter will be a two-phase effort. First, standard heterodyne techniques and suitable line from the OP-FIR laser will be sued to determine the width of a free-running SFCL line. It is expected that this will be a narrow oscillation with a superimposed drift which follows variations in the drive voltage.

[TABLE 4.4]

| $q - 1$ | $\mu_c \lambda / \sigma_b$ | $\lambda / \sigma_b \vert \mu = 4$ |
|---|---|---|
| 0.1 | 27.4 | 6.8 |
| 0.2 | 18.9 | 4.7 |
| 0.5 | 11.2 | 2.8 |
| 1.0 | 7.3 | 1.8 |
| 2.0 | 4.4 | 1.1 |
| 5.0 | 2.1 | 0.51 |
| 10.0 | 1.2 | 0.29 |

Feedback stabilization will be used to "lock" the SFCL line to the laser reference.

HIGH-BRIGHTNESS CATHODES

The experiments discussed in earlier subsections relay on beam current densities in the 20–200 A/cm$^2$ range. These values can be achieved with conventional cathode and beam focussing technology. During the latter stages of the project, effort will also be devoted to assessing the impact of high current density cathodes on SFCL operation.

In order to define the parameter range under discussion, a value of $J_b = 10^3$ A/cm$^2$ will be regarded as "bright". Several emerging cathode technologies may be used to achieve values in this range. This choice is actually conservative (1.5–3 ka/cm$^2$ have been reported). Current densities in this $10^3$ A/cm$^2$ range can also be obtained from what has become known as the "microwave gun". These devices are now used as injectors for linear accelerators. They produce very high current density small diameter beams in the 0.5–5 Mev range. Both conventional (e.g., LaB$_6$) thermionic and high-brightness photo-cathodes have been used as emitters. In either case, the emerging current will have the high-peak short-pulse structure that is characteristic of linear RF-accelerator-produced beams.

A preliminary assessment of the potential impact of high-brightness cathodes on SFCL operation is presented in FIG. 19. In the right-hand column, beam radii from 1–100 $\mu$m are listed and in the second column, the total beam current in the diameter $2r_b$ is displayed. The current has been computed assuming that an average of $10^3$ A/cm$^2$ over the cross-section has been achieved. The beam power at beam voltages of 100 kV and 1 mV are listed in columns 3 and 4. These values provide guidance as to the output power that could be obtained at a given efficiency (n may be expected to fall in the 0.1-10% range). Finally, in the last two columns, the estimated minimum wavelength for the given beam diameter at each of the two voltages are tabulated. The wavelength has been computed assuming the coupling parameter $\mu b = 4$. Both the high and low energy beams are capable of driving in the 10 $\mu$m wavelength range. The final short-wavelength limit of a microwave-gun-driven SFCL may still smaller.

Both the high-brightness cathodes and the microwave gun technologies are still in the research stage, and an independent Dartmouth-based effort in these areas will not be attempted with the support from this proposal alone. Experience with resonator design and test gained with the in-house e-beam generators (pulse transformer, pulse line, and cw) will be used to design resonators for small diameter high-brightness beam experiments. Actual tests will be done in collaboration with outside groups with the required facilities.

SUMMARY

The basic SFCL discussed above consists of a resonator which is formed by a semiconductor film surface waveguide and either internal or external mirrors. The latter provide feedback and output coupling. The structures may be driven by a variety of electron beam generators and they are expected to produce tunable, coherent radiation over a range extending from 10's of $\mu$m through to the mm region of the spectrum. The output power and pulse structure will depend upon the beam generator option chosen. Estimated values of the saturation level yield typical efficiency values in the 0.1-10% range and output levels in the W-KW (Pulsed) region are expected.

The semiconductor film resonators have a number of unique features which lend themselves to SFCL operation. Among them are: low loss in the spectral range of interest, the potential for forming integrated resonators, high relative indices of refraction, and the ability to bleed charge via their finite dc resistivity. These will be investigated and exploited during the second and third years of the project. Finally, during the third year, integration of modern high-brightness cathode technology with SFCL resonator will be explored. The combination of these two emerging technologies is a potential basis for a new general class of compact, versatile and widely-tunable sources.

It will thus be seen that the invention efficiently attains the objects set forth above, among those made apparent from the preceding description. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Laser apparatus comprising
   resonator means for defining a resonant cavity in which stimulated radiation can propagate to generate coherent electromagnetic laser radiation, said resonator means including
      at least one semiconductor element having at least a first surface, and
   means for directing a beam of electrons over said surface in a direction substantially parallel to said surface and at a selected proximity to said surface, said electrons having a velocity greater than a selected value determined by the phase velocity of light in said resonator means, to produce stimulated radiation so that said stimulated radiation propagates in said resonant cavity to generate coherent electromagnetic laser radiation.

2. Laser apparatus according to claim 1 wherein said resonator means further comprises
   a resonant cavity element having first and second ends, said first and second ends being positioned so that said beam enters said resonant cavity element at said first end and exits said resonant cavity element at said second end.

3. Laser apparatus according to claim 2 wherein said resonator means further comprises
   first mirror means, positioned in proximity to an interior portion of said first end, for reflecting said stimulated radiation, and
   second mirror means, positioned in proximity to an interior portion of said second end, for reflecting said stimulated radiation.

4. Laser apparatus according to claim 1 wherein said means for directing a beam of electrons includes electron beam generating means for generating an electron beam characterized by a selected beam voltage.

5. Laser apparatus according to claim 4 wherein said means for directing a beam of electrons includes means for generating a magnetic field in proximity to said electron beam, to constrain said electron beam to pass over said surface in a direction substantially parallel to said surface in selected proximity to said surface.

6. Laser apparatus according to claim 1 further comprising tuning means for varying a characteristic wavelength of said coherent electromagnetic laser radiation.

7. Laser apparatus according to claim 6 wherein said tuning means includes beam control means, coupled to said means for directing a beam of electrons, for varying electron beam energy to vary said wavelength of said coherent electromagnetic laser radiation.

8. Laser apparatus according to claim 6 wherein said tuning means includes bias means, in electrical communication with said semiconductor element, for applying a bias voltage to said semiconductor element to vary said wavelength of said coherent electromagnetic laser radiation.

9. Laser apparatus according to claim 1, wherein said first surface is substantially planar.

10. Laser apparatus according to claim 1, wherein said first surface is curved.

11. Laser apparatus according to claim 1, wherein the semiconductor element is constructed from at least one of silicon, silicon with dopant, or silicon deposited on a substrate.

12. Laser apparatus according to claim 11, wherein said substrate is constructed from at least one of plastic, quartz, sapphire, or metal.

13. Laser apparatus according to claim 1, wherein said semiconductor element is composed of any of silicon, germanium, or gallium arsenide.

14. Laser apparatus according to claim 1, wherein said semiconductor element is characterized by an index of refraction substantially between 3.5 and 4.

15. Laser apparatus according to claim 1, wherein said first surface comprises a grating pattern characterized by selected grating height and separation.

16. Laser apparatus according to claim 4, wherein said electron beam generating means includes a high-brightness cathode element.

17. Laser apparatus according to claim 4, wherein said electron beam generating means includes an RF accelerator.

18. Laser apparatus according to claim 4, wherein said electron beam generating means includes a pulsed beam generating element.

19. Laser apparatus according to claim 1, wherein said coherent electromagnetic laser radiation is in the spectral range of 1 centimeter to 0.2 microns.

20. Laser apparatus according to claim 2, further comprising vacuum means for evacuating a region about said resonant cavity element.

21. Laser apparatus according to claim 2, further comprising means situated proximate said second end for absorbing electrons exiting said resonant cavity element.

* * * * *